US010930257B2

(12) United States Patent
O'Driscoll et al.

(10) Patent No.: US 10,930,257 B2
(45) Date of Patent: *Feb. 23, 2021

(54) SYSTEM AND METHOD FOR PROVIDING A VIDEO WITH LYRICS OVERLAY FOR USE IN A SOCIAL MESSAGING ENVIRONMENT

(71) Applicant: SPOTIFY AB, Stockholm (SE)

(72) Inventors: Brendan O'Driscoll, San Francisco, CA (US); Aidan Sliney, Stockholm (SE); Craig Watson, Stockholm (SE)

(73) Assignee: SPOTIFY AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/512,137

(22) Filed: Jul. 15, 2019

(65) Prior Publication Data

US 2020/0184937 A1    Jun. 11, 2020

Related U.S. Application Data

(63) Continuation of application No. 15/858,507, filed on Dec. 29, 2017, now Pat. No. 10,354,633.

(Continued)

(51) Int. Cl.
*G10H 1/36*    (2006.01)
*G06F 16/40*    (2019.01)
(Continued)

(52) U.S. Cl.
CPC ........... *G10H 1/368* (2013.01); *G06F 3/0482* (2013.01); *G06F 3/0484* (2013.01); *G06F 16/40* (2019.01);
(Continued)

(58) Field of Classification Search
CPC .. G10H 1/368; G10H 1/365; G10H 2220/011; G06F 16/40; G06F 16/437;
(Continued)

(56) References Cited

U.S. PATENT DOCUMENTS 8,745,500 B1    6/2014 Kostello et al.
2005/0123886 A1    6/2005 Hua et al.
(Continued)

OTHER PUBLICATIONS

European Patent Office, Extended European Search Report dated Feb. 13, 2018 for European Patent Application No. 17210731.0, 6 pages.

(Continued)

*Primary Examiner* — Jin Ge
(74) *Attorney, Agent, or Firm* — Tucker Ellis LLP

(57) ABSTRACT

In accordance with an embodiment, described herein is a system and method for providing a live lyrics overlay in a social messaging environment. The system can utilize advances in three-dimensional mapping technology that allow social messaging services, to offer real time video lenses or overlays to their users, and extends this three-dimensional mapping technology to support for lyrics. During creation of a video with lyrics lens overlay, the lyrics corresponding to a selected song are retrieved from a lyrics source, and are displayed within the video. For example, with the lyrics lens, a user can record an image of themselves on live video, singing along to a song clip, with the lyrics of the song displayed as if they appear to be coming from their mouths. The created live lyrics content can also be shared with other users of a social messaging environment.

12 Claims, 14 Drawing Sheets

Related U.S. Application Data

(60) Provisional application No. 62/440,827, filed on Dec. 30, 2016, provisional application No. 62/440,833, filed on Dec. 30, 2016, provisional application No. 62/440,837, filed on Dec. 30, 2016.

(51) Int. Cl.

| | | |
|---|---|---|
| *G06F 16/435* | (2019.01) | |
| *G06F 16/9535* | (2019.01) | |
| *G06Q 10/10* | (2012.01) | |
| *G06Q 50/00* | (2012.01) | |
| *G06F 3/0484* | (2013.01) | |
| *H04N 21/431* | (2011.01) | |
| *H04N 21/462* | (2011.01) | |
| *G06F 3/0482* | (2013.01) | |
| *H04L 12/58* | (2006.01) | |
| *H04L 29/06* | (2006.01) | |
| *H04N 21/222* | (2011.01) | |
| *H04N 21/233* | (2011.01) | |
| *H04N 21/234* | (2011.01) | |
| *H04N 21/235* | (2011.01) | |
| *H04N 21/435* | (2011.01) | |
| *H04N 21/439* | (2011.01) | |
| *H04N 21/44* | (2011.01) | |
| *H04N 21/4788* | (2011.01) | |
| *H04N 21/8545* | (2011.01) | |

(52) U.S. Cl.
CPC ........ *G06F 16/437* (2019.01); *G06F 16/9535* (2019.01); *G06Q 10/10* (2013.01); *G06Q 10/107* (2013.01); *G06Q 50/01* (2013.01); *G10H 1/365* (2013.01); *H04L 51/10* (2013.01); *H04L 51/32* (2013.01); *H04L 65/403* (2013.01); *H04N 21/2223* (2013.01); *H04N 21/233* (2013.01); *H04N 21/234* (2013.01); *H04N 21/235* (2013.01); *H04N 21/435* (2013.01); *H04N 21/439* (2013.01); *H04N 21/4312* (2013.01); *H04N 21/44* (2013.01); *H04N 21/4622* (2013.01); *H04N 21/4788* (2013.01); *H04N 21/8545* (2013.01); *G10H 2220/011* (2013.01)

(58) Field of Classification Search
CPC .. G06F 16/9535; G06F 3/0482; G06F 3/0484; G06Q 10/10; G06Q 10/107; G06Q 50/01; H04L 51/10; H04L 51/32; H04L 65/403; H04N 21/2223; H04N 21/233; H04N 21/234
USPC ....................................................... 345/629
See application file for complete search history.

(56) References Cited

U.S. PATENT DOCUMENTS

| | | | |
|---|---|---|---|
| 2008/0163283 A1 | 7/2008 | Tan et al. | |
| 2008/0274687 A1* | 11/2008 | Roberts ................ | G06Q 30/02 455/3.06 |
| 2011/0063317 A1 | 3/2011 | Gharaat et al. | |
| 2011/0066940 A1 | 3/2011 | Asghari Kamrani et al. | |
| 2011/0087971 A1 | 4/2011 | Kamrani et al. | |
| 2011/0283236 A1 | 11/2011 | Beaumier et al. | |
| 2013/0030909 A1 | 1/2013 | Shih et al. | |
| 2013/0031497 A1 | 1/2013 | Arrasvuori | |
| 2013/0086159 A1 | 4/2013 | Gharachorloo et al. | |
| 2013/0290818 A1 | 10/2013 | Arrasvuori et al. | |
| 2014/0009475 A1 | 1/2014 | Setton et al. | |
| 2014/0233917 A1 | 8/2014 | Xiang | |
| 2014/0298217 A1 | 10/2014 | Lehtiniemi et al. | |
| 2014/0337374 A1 | 11/2014 | Glass | |
| 2015/0053067 A1* | 2/2015 | Goldstein ............. | G02C 11/10 84/609 |
| 2015/0058733 A1 | 2/2015 | Novikoff | |
| 2015/0139615 A1 | 5/2015 | Hill | |
| 2015/0262005 A1 | 9/2015 | Ohmura et al. | |
| 2016/0012853 A1 | 1/2016 | Cabanilla et al. | |
| 2016/0057316 A1 | 2/2016 | Godfrey et al. | |
| 2018/0025752 A1 | 1/2018 | Patel et al. | |

OTHER PUBLICATIONS

European Patent Office, Extended European Search Report dated Feb. 13, 2018 for European Patent Application No. 17209086.2, 7 pages.
United States Patent and Trademark Office, Office Action dated Jun. 25, 2018 for U.S. Appl. No. 15/858,457, 16 pages.
United States Patent and Trademark Office, Office Action dated Jul. 24, 2018 for U.S. Appl. No. 15/858,301, 13 pages.
United States Patent and Trademark Office, Office Action dated Dec. 7, 2018 for U.S. Appl. No. 15/858,457, 25 pages.
United States Patent and Trademark Office, Office Action dated Jan. 18, 2019 for U.S. Appl. No. 15/858,301, 13 pages.
European Patent Office, Communication pursuant to Article 94(3) EPC dated May 8, 2019 for European Patent Application No. 17209086.2, 5 pages.
United States Patent and Trademark Office, Office Action dated Aug. 6, 2019 for U.S. Appl. No. 15/858,301, 16 pages.
United States Patent and Trademark Office, Office Action dated Aug. 6, 2019 for U.S. Appl. No. 15/858,457, 17 pages.
European Patent Office, Summons to attend oral proceedings dated Oct. 11, 2019 for European Patent Application No. 17209086.2, 6 pages.
European Patent Office, Summons to attend oral proceedings dated Apr. 23, 2020 for European Patent Application No. 17209086.2, 9 pages.
European Patent Office, Communication pursuant to Article 94(3) dated Aug. 14, 2018 for European Patent Application No. 17210731.0, 4 pages.
European Patent Office, Decision to refuse dated Sep. 9, 2019 for European Patent Application No. 17210731.0, 3 pages.
European Patent Office, Summons to attend oral proceedings dated Feb. 26, 2019 for European Patent Application No. 17210731.0, 6 pages.
Anonymous: "?JamCam on the App Store", , Dec. 19, 2018 (Dec. 19, 2018), pp. 1-2, XP055536563, Retrieved from the Internet: URL:https://itunes.apple.com/us/app/jamcam/id705317441 ?mt=8 [retrieved on Dec. 19, 2018].
Anonymous: "Jamcam screenshots", , Dec. 18, 2018 (Dec. 18, 2018), pp. 1-6, XP055536567, [retrieved on Dec. 19, 2018].
European Patent Office, Decision of the Examining Division dated Oct. 23, 2020, in connection with European Patent Application No. 17209086.2, 6 pages.
European Patent Office, Decision to refuse a European Patent Application dated Nov. 2, 2020, in connection with European Patent Application No. 17209086.2, 11 pages.

* cited by examiner

US 10,930,257 B2

SYSTEM AND METHOD FOR PROVIDING A VIDEO WITH LYRICS OVERLAY FOR USE IN A SOCIAL MESSAGING ENVIRONMENT

CLAIM OF PRIORITY

This application is a continuation of U.S. Patent Application titled "SYSTEM AND METHOD FOR PROVIDING A VIDEO WITH LYRICS OVERLAY FOR USE IN A SOCIAL MESSAGING ENVIRONMENT", application Ser. No. 15/858,507, filed Dec. 29, 2017; which claims the benefit of priority to U.S. Provisional Patent Application titled "SYSTEM AND METHOD FOR ASSOCIATION OF A SONG, MUSIC, OR OTHER MEDIA CONTENT WITH A USER'S VIDEO CONTENT", Application No. 62/440,827, filed Dec. 30, 2016; U.S. Provisional Patent Application titled "SYSTEM AND METHOD FOR PROGRAMMING OF SONG SUGGESTIONS FOR USERS OF A SOCIAL MESSAGING ENVIRONMENT", Application No. 62/440,833, filed Dec. 30, 2016; and U.S. Provisional Patent Application titled "SYSTEM AND METHOD FOR PROVIDING A VIDEO WITH LYRICS OVERLAY FOR USE IN A SOCIAL MESSAGING ENVIRONMENT", Application No. 62/440,837, filed Dec. 30, 2016; each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to providing digital media content, and are particularly related to a system and method for providing a live lyrics overlay in a social messaging environment.

BACKGROUND

Today's technology-enabled social messaging environments enable users to use lenses or overlays that render over live video, to provide a mode of self-expression. For example, some social messaging applications support the use of video lenses that leverage three-dimensional mapping technology, to allow users to render live video of themselves including an appearance of wearing glasses or dog ears, or of hats or flowers in their hair, wherein the lenses or overlays map to where the user's head is moving in real time. However, there is currently no mechanism for users to be able to includes a live lyrics feed in such live video creations.

SUMMARY

In accordance with an embodiment, described herein is a system and method for providing a live lyrics overlay in a social messaging environment. The system can utilize advances in three-dimensional mapping technology that allow social messaging services, to offer real time video lenses or overlays to their users, and extends this three-dimensional mapping technology to support for lyrics. During creation of a video with lyrics lens overlay, the lyrics corresponding to a selected song are retrieved from a lyrics source, and are displayed within the video. For example, with the lyrics lens, a user can record an image of themselves on live video, singing along to a song clip, with the lyrics of the song displayed as if they appear to be coming from their mouths. The created live lyrics content can also be shared with other users of a social messaging environment.

DETAILED DESCRIPTION

As described above, although some social messaging applications support the use of video lenses that leverage three-dimensional mapping technology, there is currently no mechanism for users to be able to includes a live lyrics feed in such live video creations.

In accordance with an embodiment, described herein is a system and method for providing a live lyrics overlay in a social messaging environment. The system can utilize advances in three-dimensional mapping technology that allow social messaging services, to offer real time video lenses or overlays to their users, and extends this three-dimensional mapping technology to support for lyrics. During creation of a video with lyrics lens overlay, the lyrics corresponding to a selected song are retrieved from a lyrics source, and are displayed within the video. For example, with the lyrics lens, a user can record an image of themselves on live video, singing along to a song clip, with the lyrics of the song displayed as if they appear to be coming from their mouths. The created live lyrics content can also be shared with other users of a social messaging environment.

Digital Media Content Environments

Figure 1:
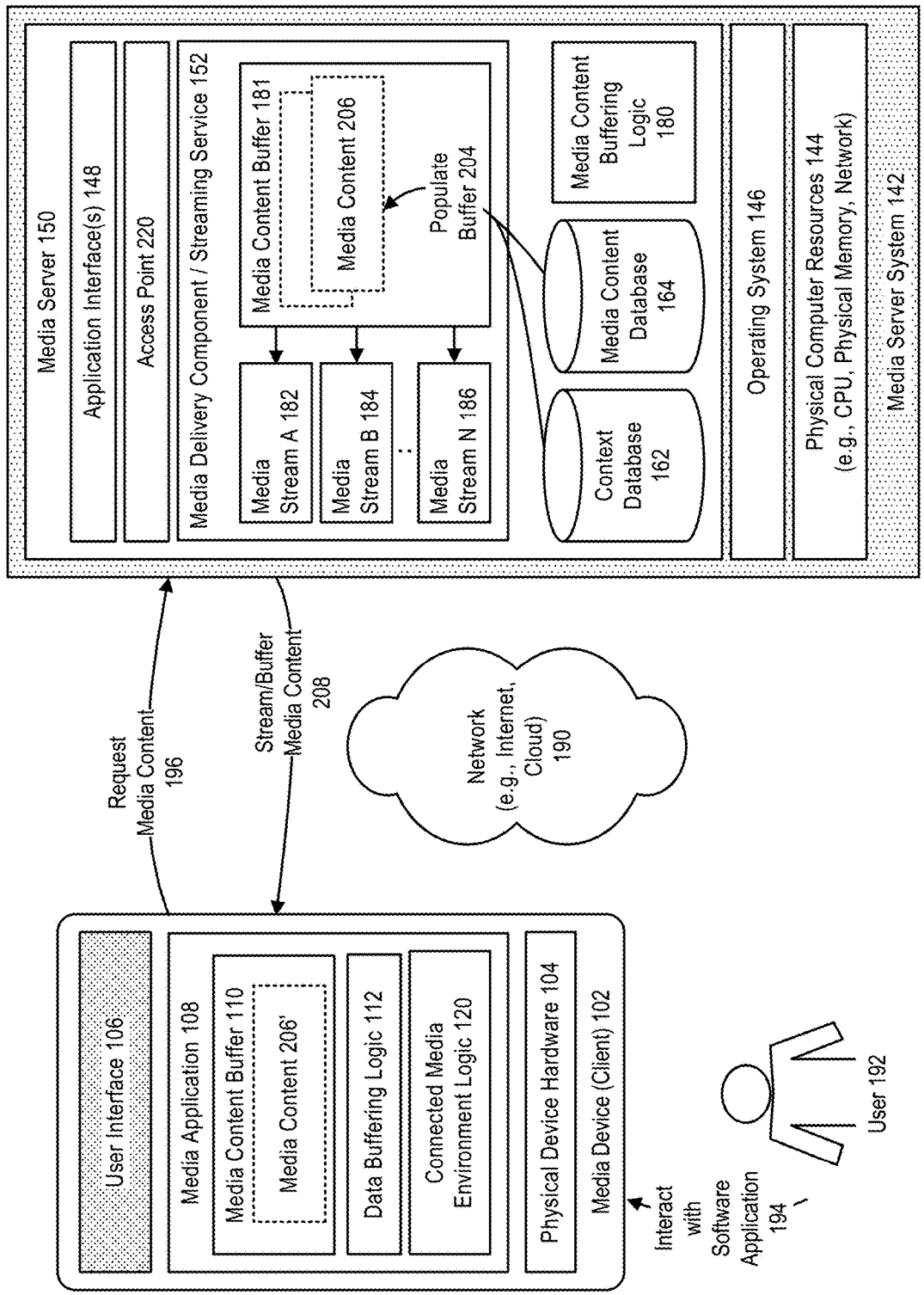
FIG. 1 illustrates an example digital media content environment, in accordance with an embodiment.

FIG. 1 illustrates an example digital media content environment, in accordance with an embodiment.

As illustrated in FIG. 1, in accordance with an embodiment, a media device 102, operating as a client device, can receive and play media content provided by a media server system 142 (media server), or by another system or peer device. In accordance with an embodiment, the media device can be, for example, a personal computer system, handheld entertainment device, tablet device, smartphone, television, audio speaker, in-car entertainment system, or other type of electronic or media device that is adapted or able to prepare a media content for presentation, control the presentation of media content, and/or play or otherwise present media content.

In accordance with an embodiment, each of the media device and the media server can include, respectively, one or more physical device or computer hardware resources 104, 144, such as one or more processors (CPU), physical memory, network components, or other types of hardware resources.

Although, for purposes of illustration, a single client media device and media server are shown, in accordance with an embodiment a media server can support the simultaneous use of a plurality of client media devices. Similarly, in accordance with an embodiment, a client media device can access media content provided by a plurality of media servers, or switch between different media streams produced by one or more media servers.

In accordance with an embodiment, the media device can optionally include a touch-enabled or other type of display screen having a user interface 106, which is adapted to display media options, for example as an array of media tiles, thumbnails, or other format, and to determine a user interaction or input. Selecting a particular media option, for example a particular media tile or thumbnail, can be used as a command by a user and/or the media device, to the media server, to download, stream or otherwise access a corresponding particular media content item or stream of media content.

In accordance with an embodiment, the media device can also include a software media application 108, together with an in-memory client-side media content buffer 110, and a client-side data buffering logic or software component 112, which can be provided as software or program code that is executable by a computer system or other processing device, and which can be used to control the playback of media content received from the media server, for playing either at a requesting media device (i.e., controlling device) or at a controlled media device (i.e., controlled device), in the manner of a remote control.

In accordance with an embodiment, a connected media environment logic or software component 120, which can be provided as software or program code that is executable by a computer system or other processing device, can be provided at the media device, either as part of the media application, or separately, for example as a firmware, to enable the media device to participate within a connected media environment (e.g., a Spotify Connect environment) that enables a user to control the playback of media content at such controlled devices.

In accordance with an embodiment, the client-side data buffering logic, together with the media content buffer, enables a portion of media content items, or samples thereof, to be pre-buffered at a client media device. For example, while media options are being prepared for display on a user interface, e.g., as media tiles or thumbnails, their related media content can be pre-buffered at the same time, and cached by one or more media devices in their media content buffers, for prompt and efficient playback when required.

In accordance with an embodiment, the media server can include an operating system 146 or other processing environment which supports execution of a media server 150 that can be used, for example, to stream music, video, or other forms of media content to a client media device, or to a controlled device.

In accordance with an embodiment, the media server can provide a subscription-based media streaming service, for which a client media device or user can have an associated account and credentials, and which enable the user's media device to communicate with and receive content from the media server. A received media-access request from a client media device can include information such as, for example, a network address, which identifies a destination media device to which the media server should stream or otherwise provide media content, in response to processing the media-access request.

For example, a user may own several media devices, such as a smartphone and an audio speaker, which can play media content received from a media server. In accordance with an embodiment, identifying information provided with a media-access request can include an identifier, such as an IP address, MAC address, or device name, which identifies that the media-access request is intended for use with a particular destination device. This allows a user, for example, to use their smartphone as a controlling device, and their audio speaker as a controlled device to which media content should be sent. The media server can then send the requested media and/or forward the media-access request to the audio speaker, even though the request originated at the user's smartphone.

In accordance with an embodiment, one or more application interface(s) 148 can receive requests from client media devices, or from other systems, to retrieve media content from the media server. A context database 162 can store data associated with the presentation of media content by a client media device, including, for example, a current position within a media stream that is being presented by the media device, or a playlist associated with the media stream, or one or more previously-indicated user playback preferences. The media server can transmit context information associated with a media stream to a media device that is presenting that stream, so that the context information can be used by the device, and/or displayed to the user. The context database can be used to store a media device's current media state at the media server, and synchronize that state between devices, in a cloud-like manner. Alternatively, media state can be shared in a peer-to-peer manner, wherein each device is aware of its own current media state which is then synchronized with other devices as needed.

For example, in accordance with an embodiment, when the destination media device to which the media content is being streamed changes, say from a controlling device to a controlled device, or from a first controlled device to a second controlled device, then the media server can transmit context information associated with an active media content to the newly-appointed destination device, for use by that device in playing the media content.

In accordance with an embodiment, a media content database 164 can include media content, for example music, songs, videos, movies, or other media content, together with metadata describing that media content. The metadata can be used to enable users and client media devices to search within repositories of media content, to locate particular media content items.

In accordance with an embodiment, a server-side media content buffering logic or software component 180, which can be provided as software or program code that is executable by a computer system or other processing device, can be used to retrieve or otherwise access media content items, in response to requests from client media devices or other systems, and to populate a server-side media content buffer 181, at a media delivery component or streaming service 152, which can be similarly provided as software or program code that is executable by a computer system or other processing device, with streams 182, 184, 186 of corresponding media content data, which can then be returned to the requesting device or to a controlled device.

In accordance with an embodiment, a plurality of client media devices, media server systems, and/or controlled devices, can communicate with one another using a network, for example the Internet 190, a local area network, peer-to-peer connection, wireless or cellular network, or other form of network. For example, a user 192 can interact 194 with the user interface at a client media device, and issue requests to access media content, for example the playing of a selected music or video item at their device, or at a controlled device, or the streaming of a media channel or video stream to their device, or to a controlled device.

In accordance with an embodiment, the user's selection of a particular media option can be communicated 196 to the media server, via the server's application interface. The media server can populate its server-side media content buffer at the server 204, with corresponding media content, 206 including one or more streams of media content data, and can then communicate 208 the selected media content to the user's media device, or to a controlled device as appropriate, where it can be buffered in a client-side media content buffer for playing at the device.

In accordance with an embodiment, and as further described below, the system can include a server-side media gateway or access point 220, which can be provided as software or program code that is executable by a computer system or other processing device, or other process or component, which operates as a load balancer in providing access to one or more servers, for use in processing requests at those servers. The system can enable communication between a client media device and a server, via an access point at the server, and optionally the use of one or more routers, to allow requests from the client media device to be processed either at that server and/or at other servers.

For example, in a Spotify media content environment, Spotify clients operating on media devices can connect to various Spotify back-end processes via a Spotify "access-point", which forwards client requests to other servers, such as sending one or more metadataproxy requests to one of several metadataproxy machines, on behalf of the client or end user.

Access to Media Content from Social Messaging Environments

In accordance with an embodiment, the system can enable access to digital media content via a social messaging environment, for example through the use of a client-side messaging application, or a software conversational agent or "bot". The media server can recommend or otherwise determine items of media content appropriate to a particular user interaction. The recommended media content can be provided to a media device, in the form of a link or other type of reference by which the user of the device can stream, download, access, or otherwise use the media content.

Figure 2:
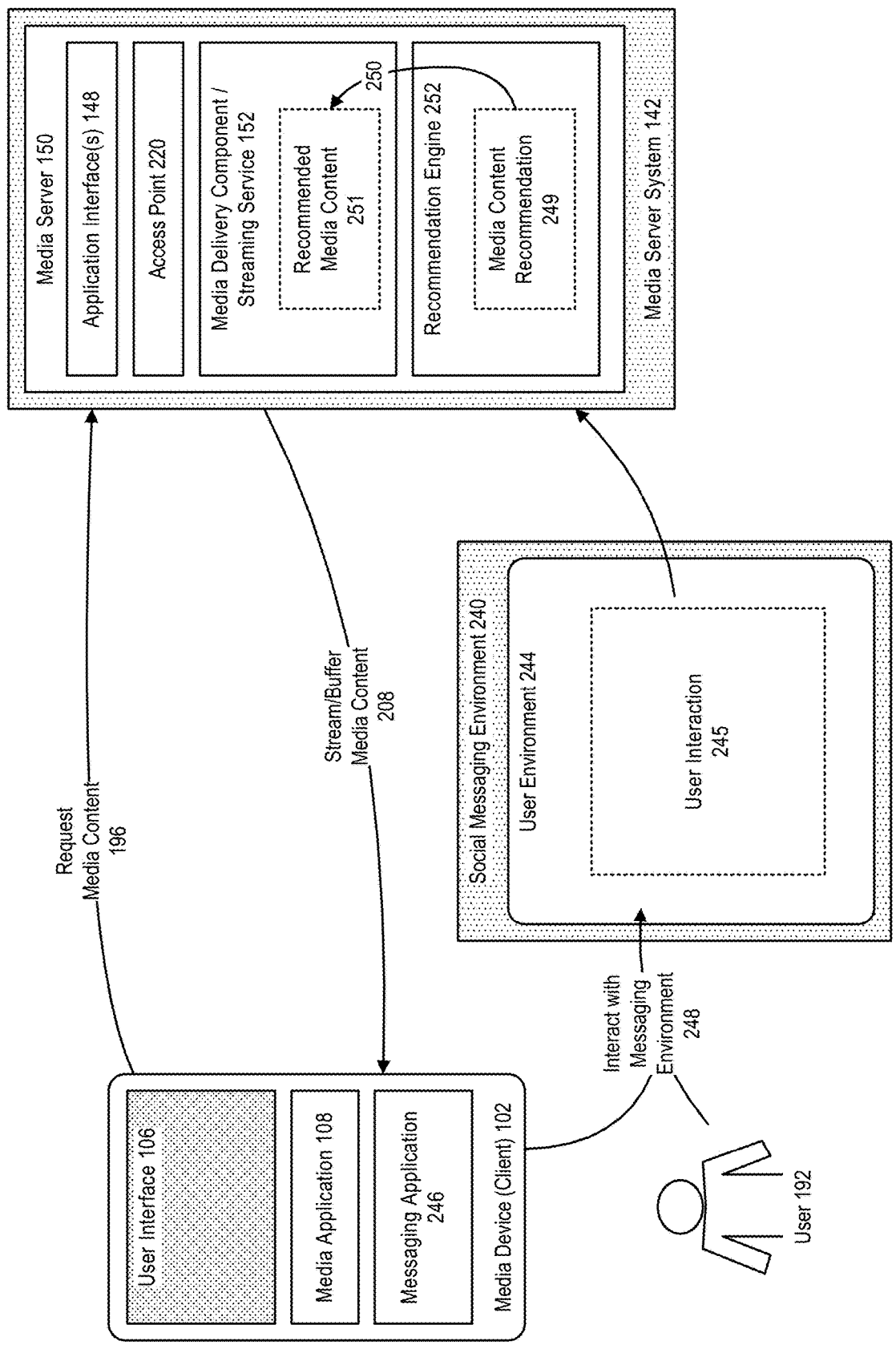
FIG. 2 illustrates a system which enables access to media content from a messaging environment, in accordance with an embodiment.

FIG. 2 illustrates a system that enables access to media content from a social messaging environment, in accordance with an embodiment.

As illustrated in FIG. 2, in accordance with an embodiment, a social messaging environment 240 enables, for each user, a user environment 244 that provides a user experience, and the use of a messaging application 246 that enables interaction by the user with the social messaging environment and with other users.

In accordance with various embodiments, different types of social messaging environments can be supported, including, for example, social networking or social media environments (e.g., Instagram), which support the sharing of picture-based or other messages between different users, or social messaging environments (e.g., Facebook Messenger) which support the use of a media content bot that operates according to a bot conversation logic to provide access to a media content environment.

In accordance with an embodiment, the media server can include a recommendation application program interface (API), which is accessible, e.g., via a HTTP URL, and which provides access to a recommendation engine 252 that provides media content recommendations in response to interactions or conversations with the social messaging environment.

For example, in accordance with an embodiment, during the interaction 248 by a user with the social messaging environment, the messaging application or bot can access the media server, via the recommendation API, and provide a user interaction information 245, to the recommendation engine, for its use in determining a media content recommendation 249, and populating 250 the media delivery component or streaming service with the recommended media content 251.

The media server can then return, as part of the conversation or other interaction with the user, a media content recommendation in the form of a link or other type of reference by which the user of the device can stream, download, access, or otherwise use the media content.

In accordance with an embodiment, the recommendation engine can determine a media content recommendation based on criteria such as, for example, a user's prior listening history, or favorite media content; other user characteristics such as demographic information; external-sourced information, such as the current weather at the user's locations; or other types of criteria.

In accordance with an embodiment, once the link or other type of reference to access the recommended media content has been returned to the media device as part of the interaction, it can be processed by the media device, to request that the recommended media content be returned either to the media device or to a controlled device, for playback at that device.

For example, the link or reference to an item of media content can be provided as:

https://open.spotify.com/track/01G6a8O85SXIH05upiDN1N

The above link can then be passed or otherwise processed by a media server web service API, to request the associated media content.

In accordance with various embodiments, the messaging application or media content bot can either operate anonymously, or can perform an authentication or account verification at the media server, for example, to indicate the user as a Spotify user, and customize the response accordingly.

Lyrics Lens Overlay

In accordance with an embodiment, the system includes support for providing a live lyrics overlay in a social messaging environment.

The system can utilize advances in three-dimensional mapping technology that allow social messaging services, to offer real time video lenses or overlays to their users, and extends this three-dimensional mapping technology to support for lyrics.

During creation of a video with lyrics lens overlay, the lyrics corresponding to a selected song are retrieved from a lyrics source, and are displayed within the video. For example, with the lyrics lens, a user can record an image of themselves on live video, singing along to a song clip, with the lyrics of the song displayed as if they appear to be coming from their mouths. The created live lyrics content can also be shared with other users of a social messaging environment.

Figure 3:
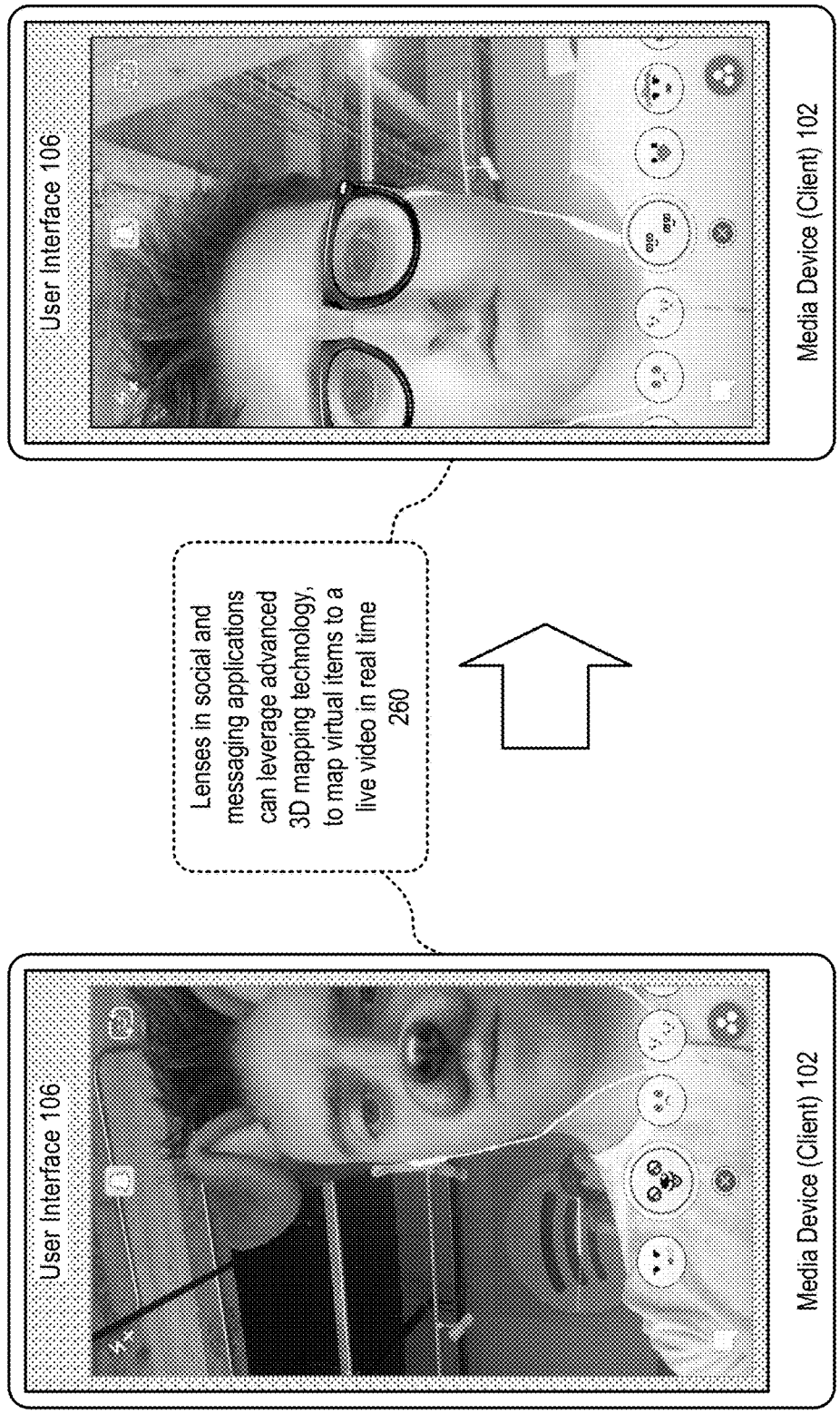
FIG. 3 illustrates the use of live overlays in a social messaging environment, in accordance with an embodiment.

FIG. 3 illustrates the use of live overlays in a social messaging environment, in accordance with an embodiment.

As illustrated in FIG. 3, lenses in social messaging applications can leverage advanced three-dimensional (3D) mapping technology, to map virtual items to a live video in real time (260). For example, some social messaging applications, such as Snapchat, support the use of video lenses that leverage 3D mapping technology, to allow users to render live video of themselves including an appearance of wearing glasses or dog ears, or of hats or flowers in their hair, wherein the lenses or overlays map to where the user's head is moving in real time.

Figure 4:
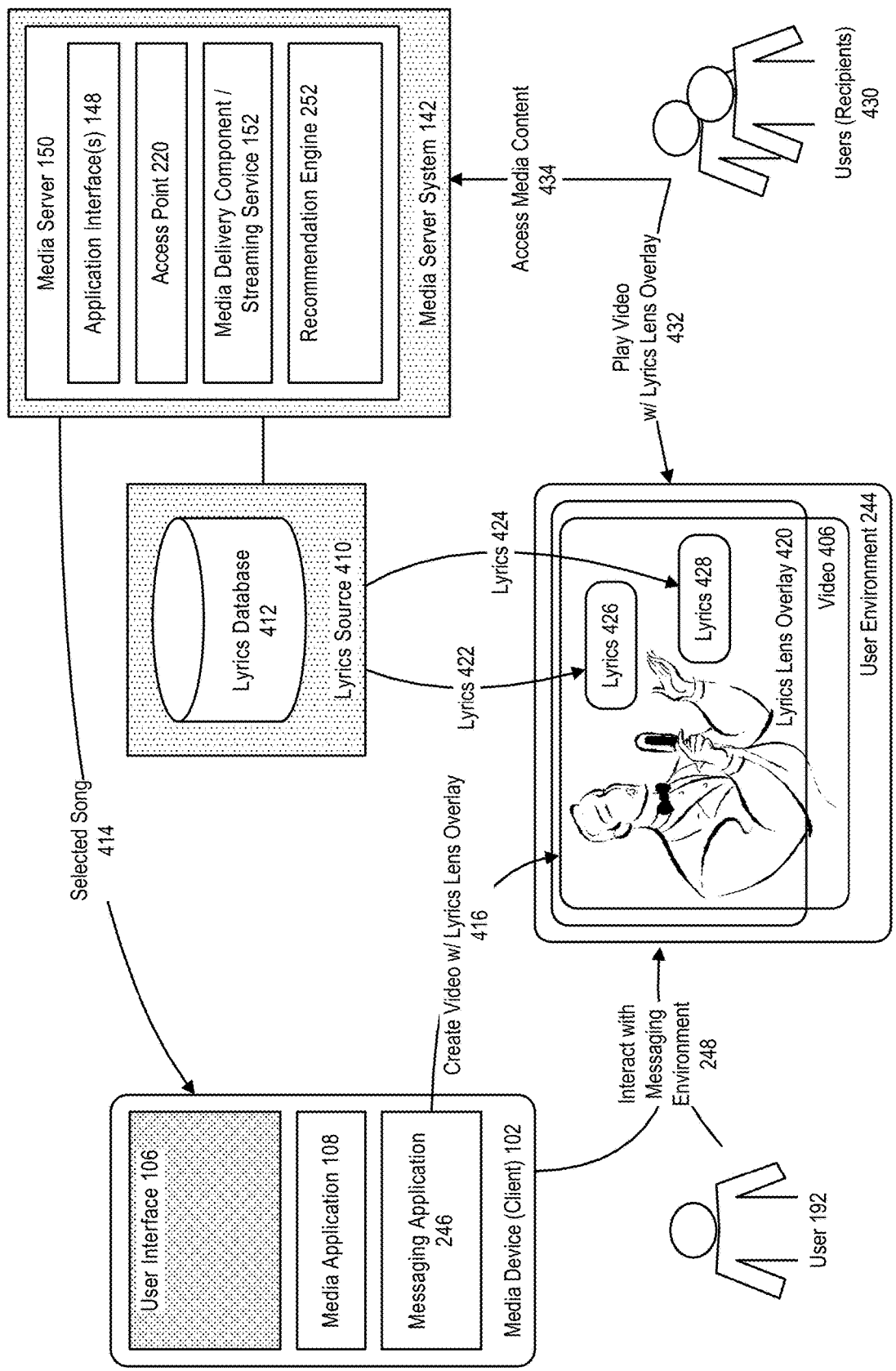
FIG. 4 further illustrates the use of live overlays in a social messaging environment, in accordance with an embodiment.

FIG. 4 further illustrates the use of live overlays in a social messaging environment, in accordance with an embodiment.

As illustrated in FIG. 4, in accordance with an embodiment, a messaging application (e.g., a Snapchat, or Messenger, etc. application), or a user-generated video content application (e.g., Instagram, etc.), enables the creation of video content, by a user, for example using a camera feature of their media device.

In accordance with an embodiment, the media server can include a recommendation engine, as described above, which can be used to provide media content recommendations, in response to interactions or conversations with the system or with a social messaging environment.

In accordance with an embodiment, a user can interact with the messaging application, or other video creation application, including utilizing its video capabilities, to access their user environment, and create a video 406.

For example, in accordance with an embodiment, a user of a social messaging environment, using a messaging application, can indicate they wish to create a message that includes live lyrics content In accordance with an embodiment, a lyrics source 410, having a lyrics database 412, can be used to provide lyrics for a selected song 414. Each song can be associated with a song metadata, which allows matching of an appropriate set of lyrics to that song. The lyrics source can be either stored at, or provided by, the media server, or by a third-party source.

In accordance with an embodiment, the song metadata provides an indication, for example a descriptive song title, that a media server can use to identify a particular song, music, or other media content that is stored at, or capable of being provided by, that media server; and to respond accordingly.

For example, in accordance with an embodiment, each particular item of media content can be associated with a 30-second audio clip from a recognizable portion of that item of media content. A media server can provide access to a 30-second clip API, which receives requests from media devices, or other devices or applications, that include a particular song metadata, and responds by streaming or otherwise providing the 30-second audio clip associated with that song.

Similarly, in accordance with an embodiment, the song metadata can be used to identify the appropriate lyrics associated with that particular song, music, or other media content, or the associated 30-second audio clip.

In accordance with an embodiment, during creation 416 of a video with lyrics lens overlay 420, lyrics corresponding to the selected song are retrieved 422, 424, from the lyrics source, and are displayed as displayed lyrics 426, 428 within the video with lyrics lens overlay.

In accordance with an embodiment, a media file, for example a Moving Picture Experts Group (MPEG)-4 (MP4) file, or other type of media file format enabled by the capabilities of the media device and which enables metadata information to be associated with the video content of that file, for example as part of a file header information, can then be created.

In accordance with an embodiment, once created, the video with lyrics lens overlay can be provided, for example as an MP4 file, or other type of media file or set of data, to one or more users (recipients) 430, where the recipient can either play 432 the video with lyrics lens overlay, and/or access 434 the media content identified by the song metadata, at the media server.

Figure 5:
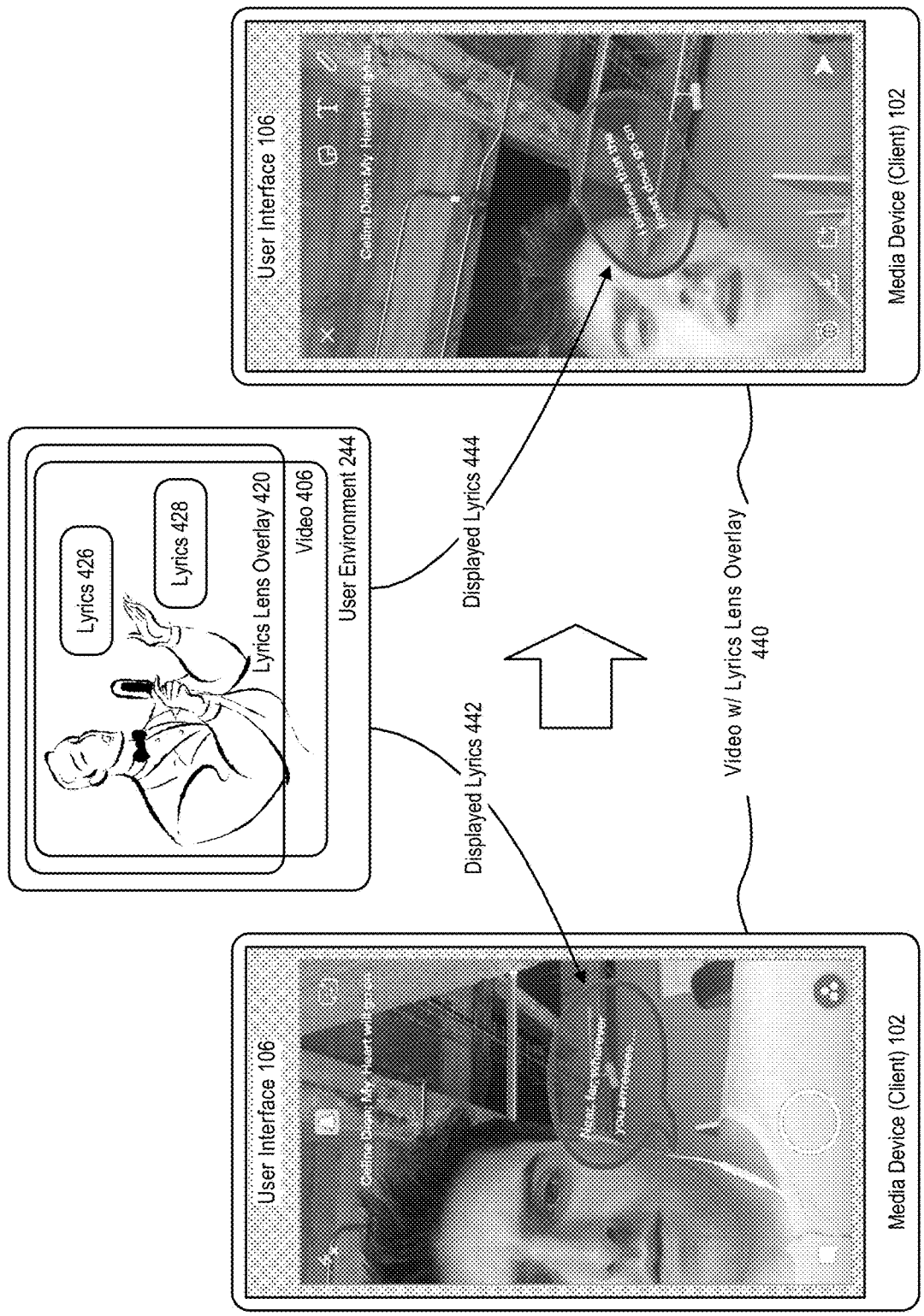
FIG. 5 illustrates the providing of a live lyrics overlay in a social messaging environment, in accordance with an embodiment.

FIG. 5 illustrates the providing of a live lyrics overlay in a social messaging environment, in accordance with an embodiment.

As illustrated in FIG. 5, in accordance with an embodiment, a recipient can play the video with lyrics lens overlay 440, including the displayed lyrics 442, 444.

Embodiments allows the user to better express themselves through the medium of music and lyrics to convey their emotions to friends or loved ones, including, for example, allowing users to map a live lyrics feed to their live video stream in real time as they record themselves singing along to their favorite songs.

For example, with the lyrics lens, a user can record an image of themselves on live video, singing along to a song clip, with the lyrics of the song displayed as if they appear to be coming from their mouths.

In accordance with various embodiments, the techniques described above can also be used in combination with features such as the creation of video moments, as described, for example, in U.S. Patent Application titled "SYSTEM AND METHOD FOR ASSOCIATION OF A SONG, MUSIC, OR OTHER MEDIA CONTENT WITH A USER'S VIDEO CONTENT"; application Ser. No. 15/858, 301, filed Dec. 29, 2017; or the programming of song suggestions, as described, for example, in U.S. Patent Applications titled "SYSTEM AND METHOD FOR PROGRAMMING OF SONG SUGGESTIONS FOR USERS OF A SOCIAL MESSAGING ENVIRONMENT"; application Ser. No. 15/858,457, filed Dec. 29, 2017; each of which above applications are herein incorporated by reference.

Figure 6:
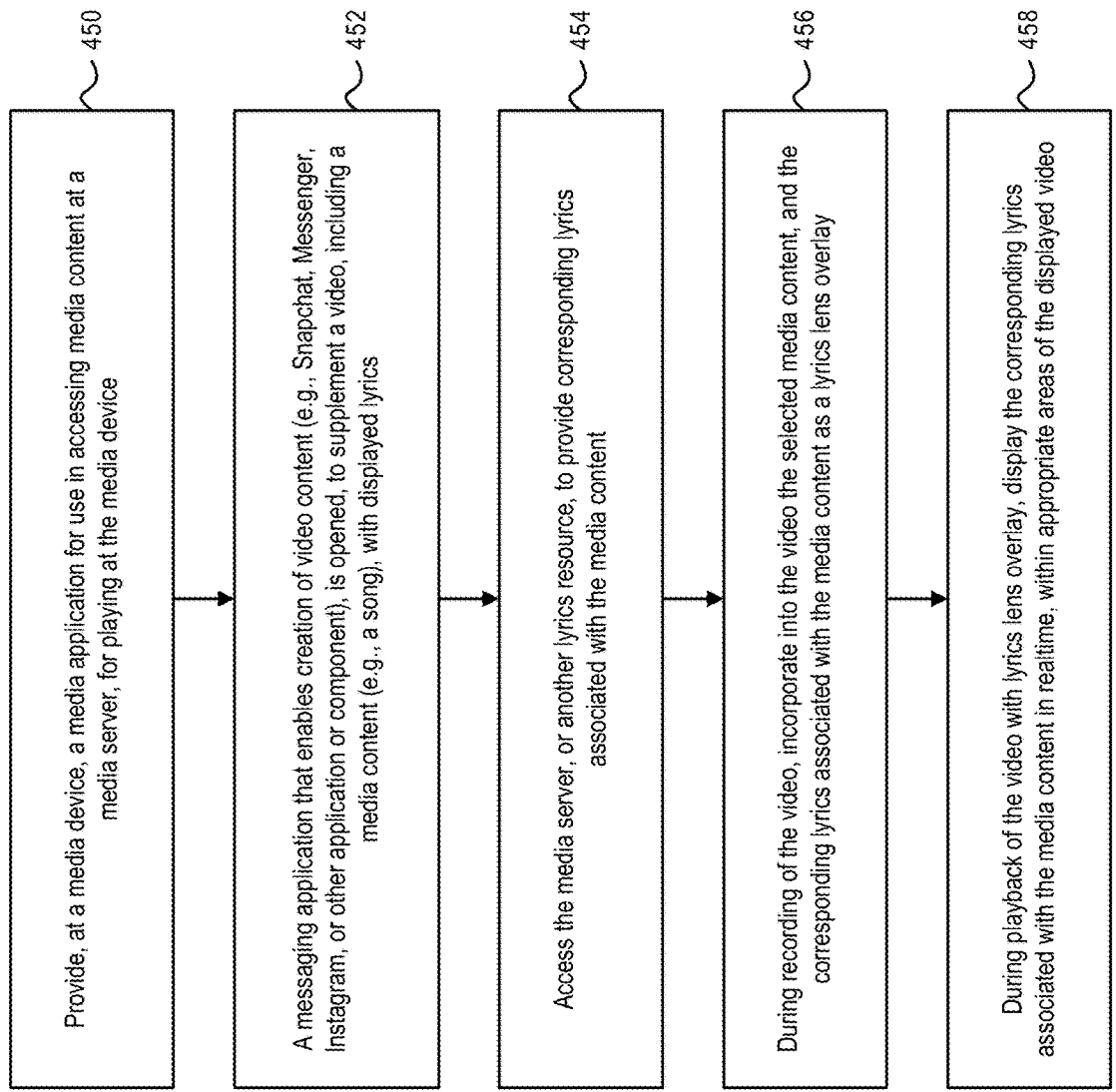
FIG. 6 illustrates a process of providing a live lyrics overlay in a social messaging environment, in accordance with an embodiment.

FIG. 6 illustrates a process of providing a live lyrics overlay in a social messaging environment, in accordance with an embodiment.

As illustrated in FIG. 6, in accordance with an embodiment, at step 450, a media application is provided for use in accessing media content at a media server, for playing at a media device.

At step 452, a messaging application that enables creation of video content (e.g., Snapchat, Messenger, Instagram, or other application or component), and which can be provided as software or program code that is executable by a computer system or other processing device, is opened, to supplement a video, including a media content (e.g., a song), with displayed lyrics.

At step 454, the media server, or another lyrics resource, is accessed to provide corresponding lyrics associated with the media content.

At step 456, during recording of the video, the selected media content, and the corresponding lyrics associated with the media content as a lyrics lens overlay, are incorporated into the video.

At step 458, during playback of the video with lyrics lens overlay, the corresponding lyrics associated with the media content are displayed in realtime, within appropriate areas of the displayed video.

In accordance with an embodiment, a method performed in a media device can comprise, by means of a media application, obtaining a selected song from a media server. The method also comprises, e.g. by means of a messaging or video application and/or using a camera of the media device, creating a live video. The method also comprises, e.g. based on metadata of the selected song, retrieving lyrics from a lyrics source corresponding to the selected song. The method also comprises, displaying the retrieved lyrics within the video in real-time as a lyrics lens overlay using 3D mapping technology. The live video with displayed lyrics may be played in a social messaging environment, where recipient users may view it or play it.

In accordance with an embodiment, a method performed in a media server system can comprise, in response to a media content request from a media device, obtaining a selected song from a media server and sending the song to the media device, e.g. to a media application thereof. The method also comprises, e.g. based on metadata of the selected song, retrieving lyrics from a lyrics source corresponding to the selected song and sending the lyrics to the media device, e.g. to a messaging or video application thereof, for incorporating the lyrics in a video in real-time as a lyrics lens overlay using 3D mapping technology.

Creation of Video Moments

In accordance with an embodiment, the system includes support for association of a song, music, or other media content with a user's video content.

The system enables a user to add a song, music, or other media content that is associated with an audio clip and a song metadata, of a media content they may be currently listening, or have just listened, to a video they are about to create, or have created. Using a video capture mode of a messaging application, or other video creation application, the user can associate a song metadata with a video, for example as an overlay, to create a shareable file or other set of data, generally referred to herein as a video moment.

A recipient of the video moment hear the audio clip in combination with the video content, and can also view the song metadata overlay, to determine the name of the song and artist that was used in the video, or optionally access the song at a media server, for further listening by the recipient.

Figure 7:
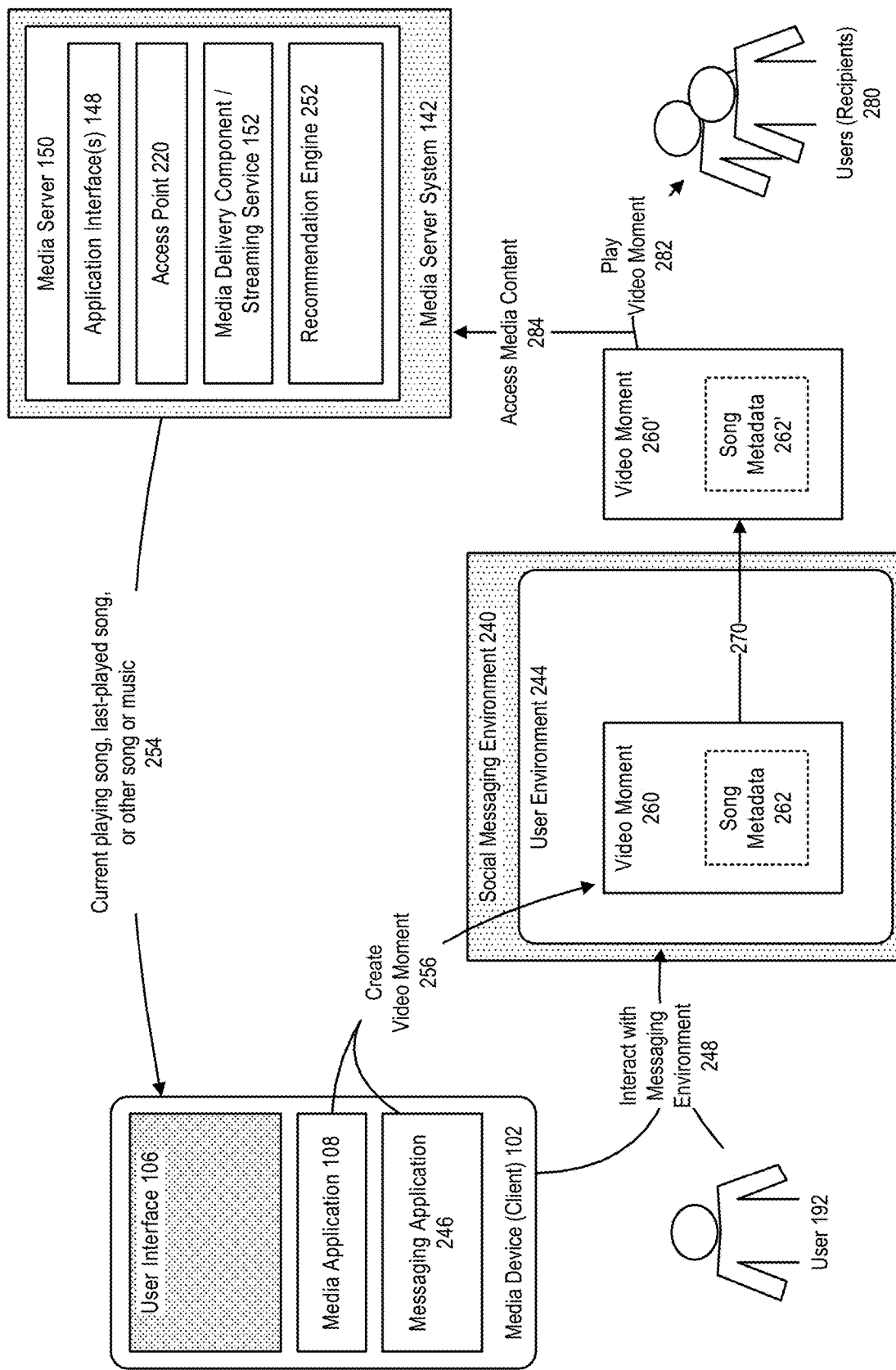
FIG. 7 illustrates association of a song, music, or other media content with a user's video content, to create a video moment, in accordance with an embodiment.

FIG. 7 illustrates the association of a song, music, or other media content with a user's video content, to create a video moment, in accordance with an embodiment.

As illustrated in FIG. 7, in accordance with an embodiment, a social messaging environment enables a messaging application, or other video creation application, to be used by a user, to interact with a user environment or with other users of the social messaging environment.

As further illustrated in FIG. 7, in accordance with an embodiment, the messaging application enables the creation of video content, by a user, for example using a camera feature of their media device.

In accordance with an embodiment, the user can either capture a new video content, or can user the functionality of their media device to retrieve a previously-recorded and saved video content.

In accordance with an embodiment, the media server can include a recommendation engine, as described above, which can be used to provide media content recommendations, in response to interactions or conversations with the system or with a social messaging environment.

In accordance with an embodiment, a user can interact with the social messaging environment, and utilize the video capabilities of their messaging application, together with a current playing song, last-played song, or other song or music 254, as provided by the media server, to create 256 a video moment.

In accordance with an embodiment, the video moment 260 can be associated with a song metadata 262 indicative of the, e.g., current playing song.

In accordance with an embodiment, the song metadata provides an indication, for example a descriptive song title, that a media server can use to identify a particular song, music, or other media content that is stored at, or capable of being provided by, that media server; and to respond accordingly.

For example, in accordance with an embodiment, each particular item of media content can be associated with a 30-second audio clip from a recognizable portion of that item of media content. A media server can provide access to a 30-second clip API, which receives requests from media devices, or other devices or applications, that include a particular song metadata, and responds by streaming or otherwise providing the 30-second audio clip associated with that song.

In accordance with an embodiment, other information that might be useful in providing a context for the video moment, for example a location information, or other information provided by sensors with a user's media device, can be associated with the video moment.

In accordance with an embodiment, a media file, for example a Moving Picture Experts Group (MPEG)-4 (MP4) file, or other type of media file format enabled by the capabilities of the media device and which enables metadata information to be associated with the video content of that file, for example as part of a file header information, can then be created.

In accordance with an embodiment, once created, the video moment can be provided 270, for example as an MP4 file, or other type of media file or set of data, to one or more users (recipients) 280, for example a user participating within the social messaging environment, where the recipient can either play 282 the video moment, and/or optionally access 284 the media content identified by the song metadata, at the media server.

Figure 8:
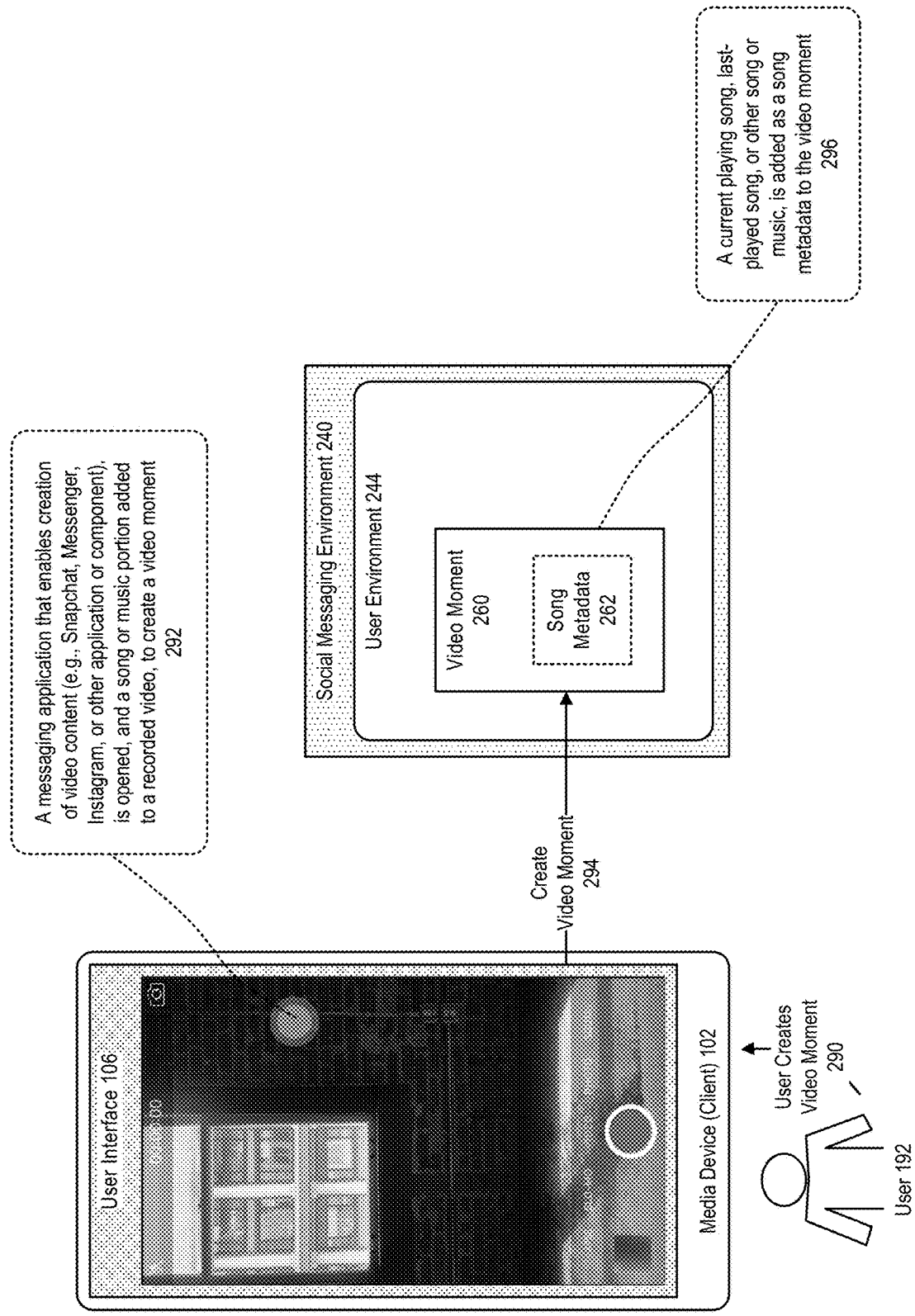
FIG. 8 further illustrates the association of a song, music, or other media content with a user's video content, to create a video moment, in accordance with an embodiment.

FIG. 8 further illustrates the association of a song, music, or other media content with a user's video content, to create a video moment, in accordance with an embodiment.

As illustrated in FIG. 8, in accordance with an embodiment, a user can indicate they wish to create a video moment (290).

A messaging application that enables creation of video content (e.g., Snapchat, Messenger, Instagram, or other application or component), and which can be provided as software or program code that is executable by a computer system or other processing device, is opened, and a song or music portion added to a recorded video, to create a video moment (292, 294).

For example, a user can long-press the video capture screen of their media device, to add a current playing song to a messaging application, or to a media application or music player (e.g., a Spotify app); or a last-played song if no song is currently playing; to add the song metadata to the video (296).

Figure 9:
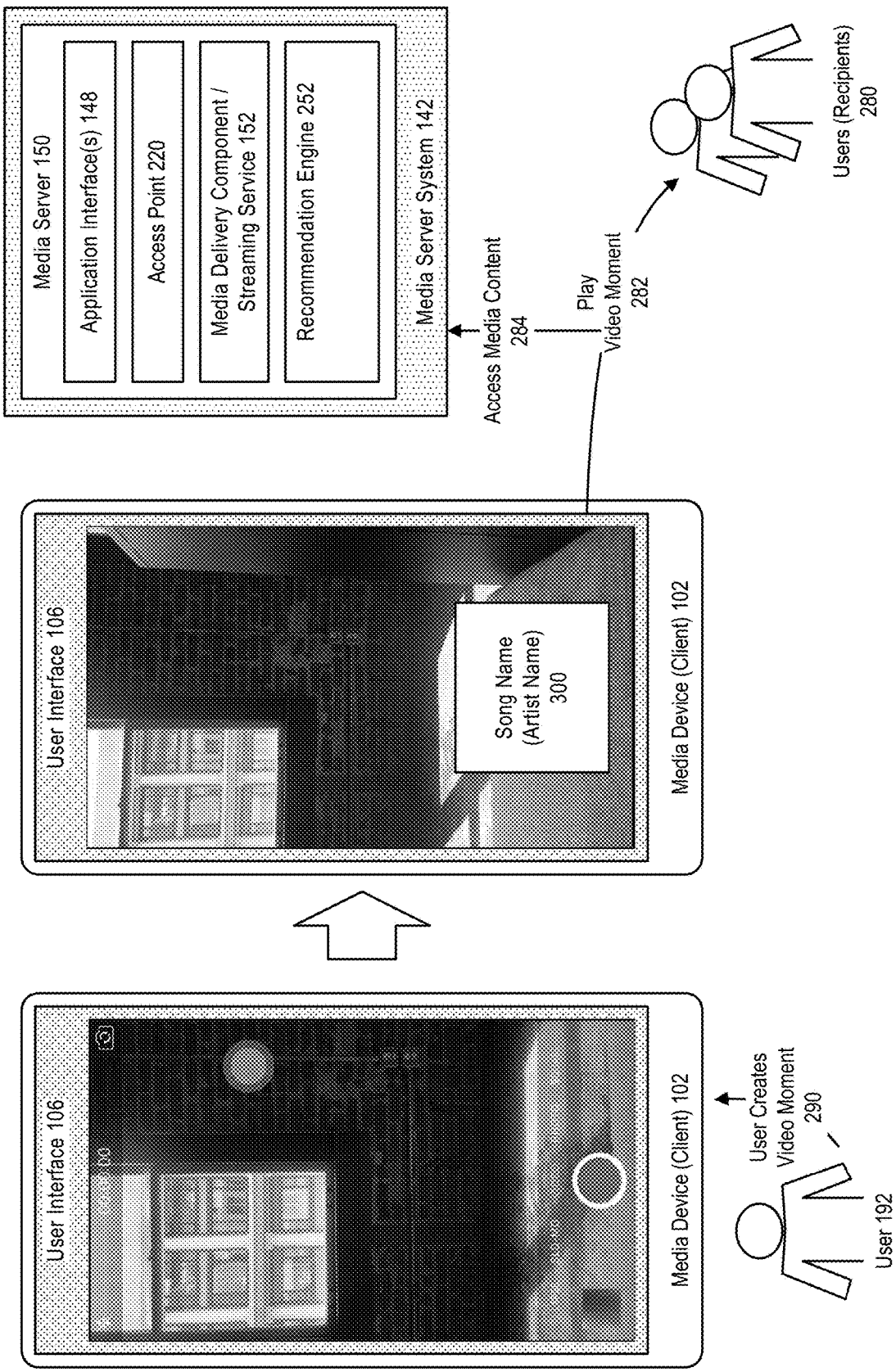
FIG. 9 further illustrates the association of a song, music, or other media content with a user's video content, to create a video moment, in accordance with an embodiment.

FIG. 9 further illustrates the association of a song, music, or other media content with a user's video content, to create a video moment, in accordance with an embodiment.

As illustrated in FIG. 9, in accordance with an embodiment, once an e.g., long-press action has been completed, a selected song metadata, e.g., song name and/or artist name 300, for the current song, music, or other media content can be added as an overlay to the video, so that the recipient can both hear the song clip, and see the song metadata when they view the video.

Figure 10:
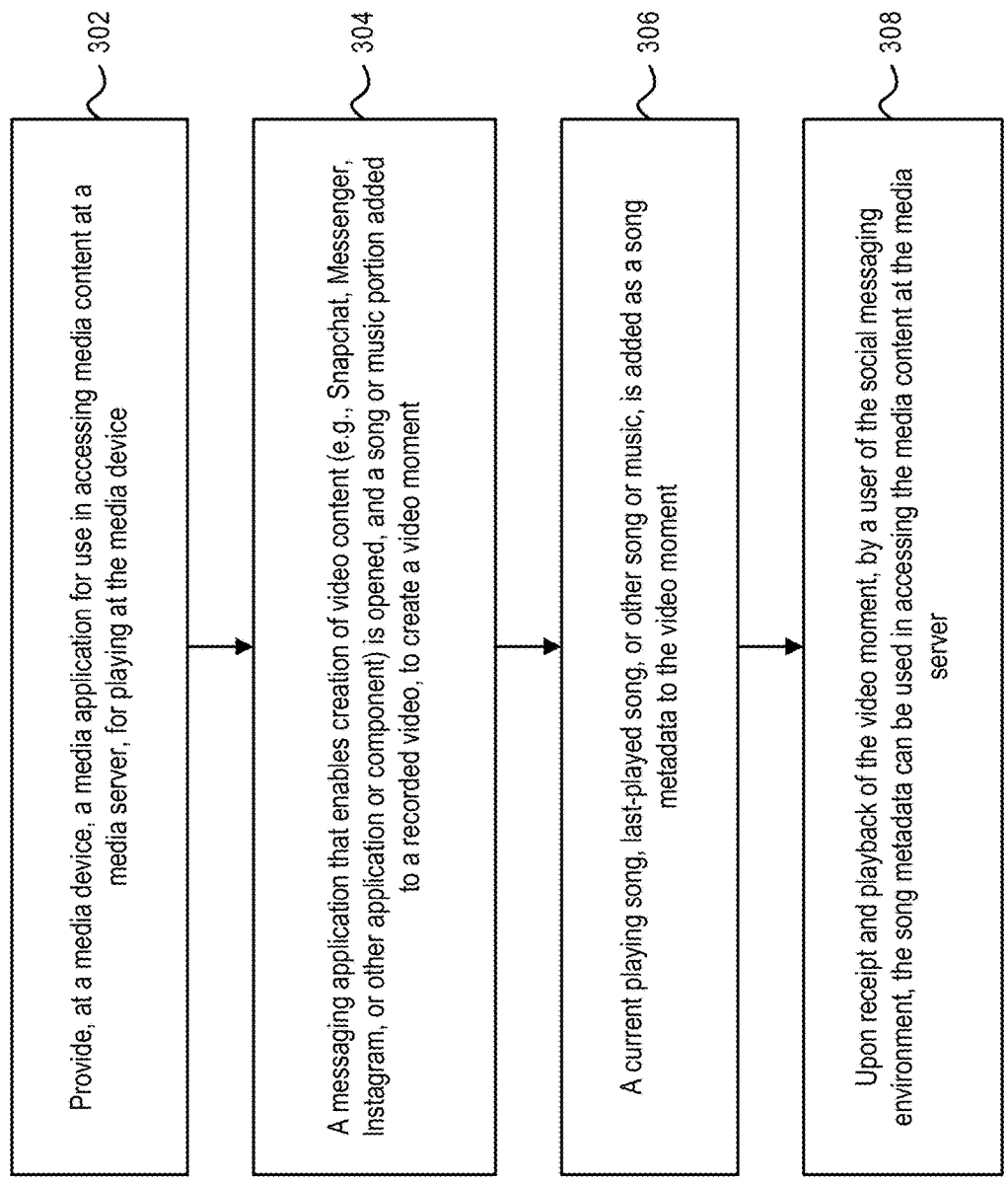
FIG. 10 illustrates a process of associating a song, music, or other media content with a user's video content, to create a video moment, in accordance with an embodiment.

FIG. 10 illustrates a process of associating a song, music, or other media content with a user's video content, to create a video moment, in accordance with an embodiment.

As illustrated in FIG. 10, in accordance with an embodiment, at step 302, a media application is provided for use in accessing media content at a media server, for playing at a media device.

At step 304, a messaging application that enables creation of video content (e.g., Snapchat, Messenger, Instagram, or other application or component) is opened, and a song or music portion added to a recorded video, to create a video moment.

At step 306, a current playing song, last-played song, or other song or music, is added as a song metadata to the video moment.

At step 308, upon receipt and playback of the video moment, by a user of the social messaging environment, the song metadata can be used in accessing the media content at the media server.

Programming of Song Suggestions

In accordance with an embodiment, the system includes support for programming of song suggestions for users of a social messaging environment.

The system enables a user to add media content, for example a song or music, to a video, for sharing with other users.

A media server can provide media content recommendations or suggestions, in response to interactions or conversations with the system or with a social messaging environment. The suggestions can be used to prompt users of social or messaging environments, to create user generated content, thereby increasing the word-of-mouth, or viral distribution and promotion of such media content.

For example, in accordance with an embodiment, the system can be used to enable a user to add a song, music, or other media content that is associated with an audio clip and a song metadata, of a media content they may be currently listening, or have just listened, to a video they are about to create, or have created. Using a video capture mode of a messaging application, or other video creation application, the user can associate a song metadata with a video content. A recipient of the video can hear the audio clip in combination with the video content, and can also view the song metadata overlay, to determine the name of the song and artist that was used in the video, or optionally access the song at a media server, for further listening by the recipient.

Figure 11:
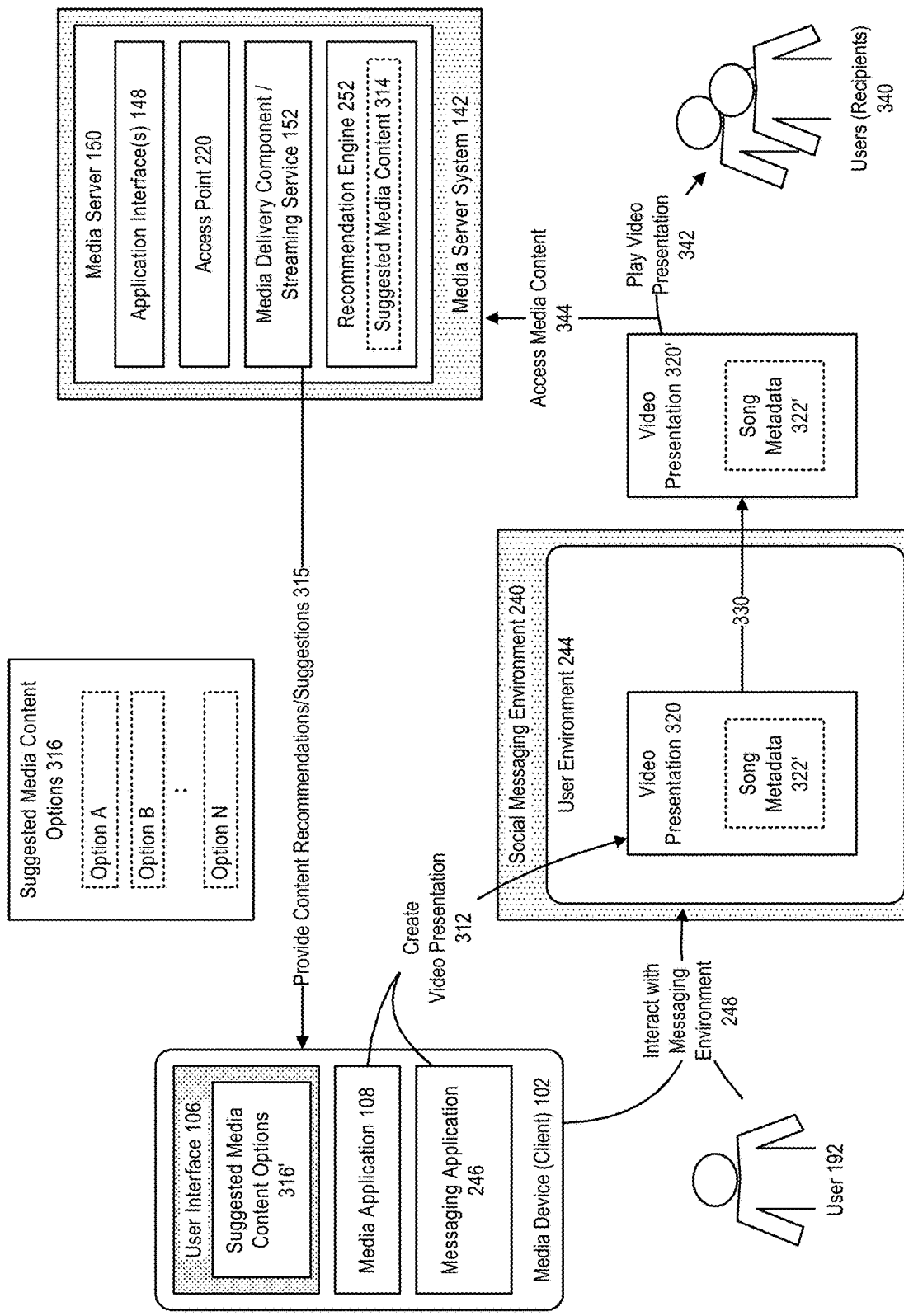
FIG. 11 illustrates the programming of song suggestions for users of a social messaging environment, in accordance with an embodiment.

FIG. 11 illustrates the programming of song suggestions for users of a social messaging environment, in accordance with an embodiment.

As illustrated in FIG. 11, in accordance with an embodiment, a social messaging environment enables a messaging application, or video creation application, to be used by a user, to interact with a user environment or with other users of the social messaging environment.

As further illustrated in FIG. 11, in accordance with an embodiment, a messaging application (e.g., a Snapchat, or Messenger, etc. application), or a user-generated video content application (e.g., Instagram, etc.), enables the creation of video content, by a user, for example using a camera feature of their media device.

In accordance with an embodiment, the media server can include a recommendation engine, as described above, which can be used to provide media content recommendations or suggestions, in response to interactions or conversations with the system or with a social messaging environment.

In accordance with an embodiment, a user can interact with the messaging application, or other video creation application, including utilizing its video capabilities, to create 312 a video presentation, in combination with a suggested media content 314.

In accordance with an embodiment, the media server can provide 315 a set of recommended or suggested media content options 316, which can be displayed on the user interface for viewing and selection by the user, in creating a video presentation 320.

In accordance with an embodiment, the video presentation can be associated with a song metadata 322 indicative of the selected media content.

In accordance with an embodiment, the song metadata provides an indication, for example a descriptive song title, that a media server can use to identify a particular song, music, or other media content that is stored at, or capable of being provided by, that media server; and to respond accordingly.

For example, in accordance with an embodiment, each particular item of media content can be associated with a 30-second audio clip from a recognizable portion of that item of media content. A media server can provide access to a 30-second clip API, which receives requests from media devices, or other devices or applications, that include a particular song metadata, and responds by streaming or otherwise providing the 30-second audio clip associated with that song.

In accordance with an embodiment, other information that might be useful in providing a context for the video presentation, for example a location information, or other information provided by sensors with a user's media device, can be associated with the video presentation. Generally, the actual content of the video is not analyzed for purposes of making a determination of the context associated with that video content.

In accordance with an embodiment, a media file, for example a Moving Picture Experts Group (MPEG)-4 (MP4) file, or other type of media file format enabled by the capabilities of the media device and which enables metadata information to be associated with the video content of that file, for example as part of a file header information, can then be created.

In accordance with an embodiment, once created, the video presentation can be provided 330, to one or more users (recipients) 340, for example as an MP4 file, or other type of media file or set of data, where the recipient can either play 342 the video presentation, and/or optionally access 344 the media content identified by the song metadata, at the media server.

Figure 12:
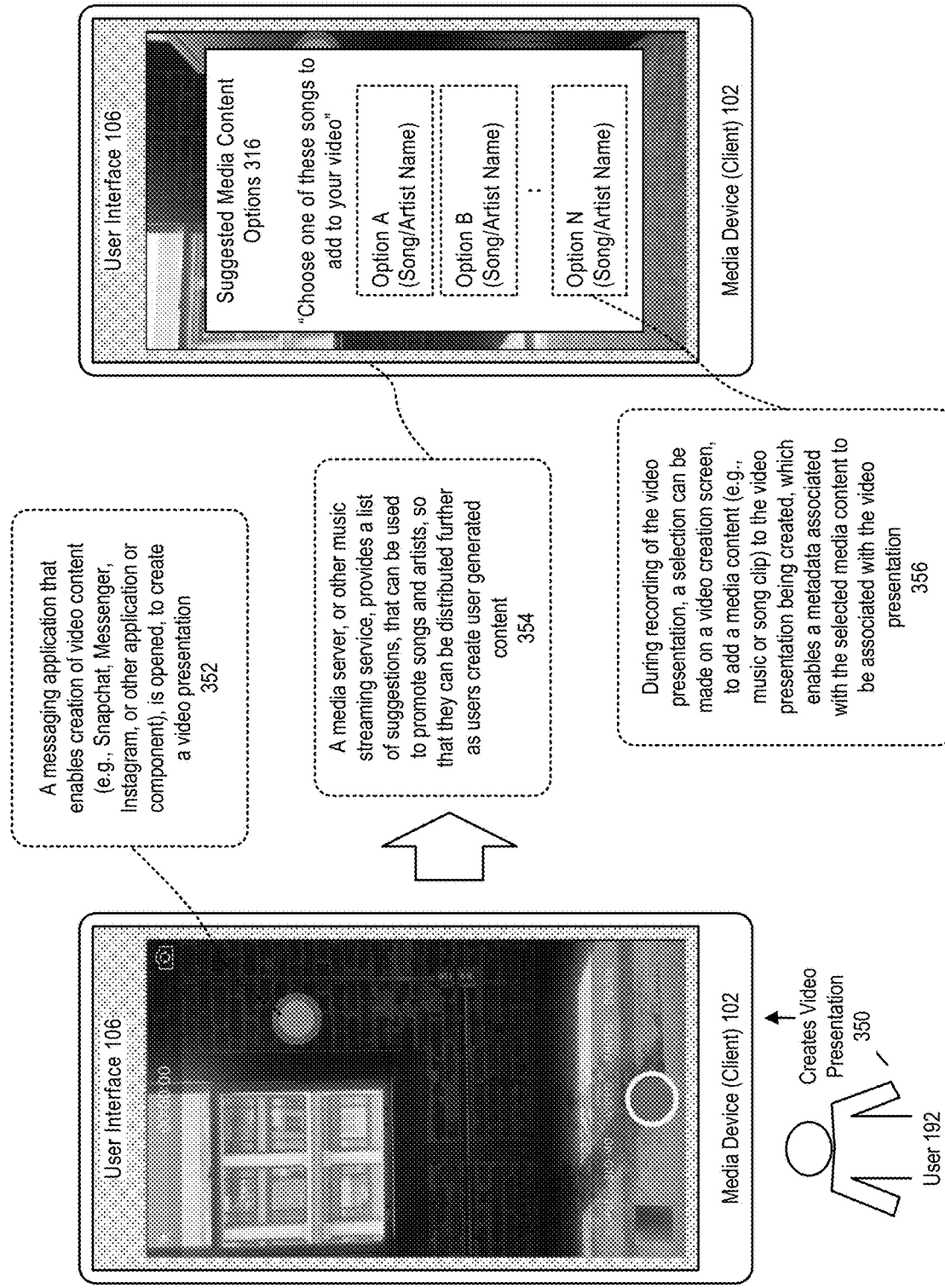
FIG. 12 further illustrates the programming of song suggestions for users of a social messaging environment, in accordance with an embodiment.

FIG. 12 further illustrates the programming of song suggestions for users of a social messaging environment, in accordance with an embodiment.

As illustrated in FIG. 12, in accordance with an embodiment, a user can indicate they wish to create a video presentation (350). A messaging application that enables creation of video content (e.g., Snapchat, Messenger, Instagram, or other application or component), is opened, to create a video presentation (352). For example, a user can long-press on a video creation screen to add a music clip to the video that they are creating.

In accordance with an embodiment, a media server, or other music streaming service, can provides a list of suggestions, that can be used to promote songs and artists, so that they can be distributed further as users create user generated content (UGC) (354).

During recording of the video presentation, a selection can be made on a video creation screen, to add a media content (e.g., music or song clip) to the video presentation being created, which enables a metadata associated with the selected media content to be associated with the video presentation (356).

Figure 13:
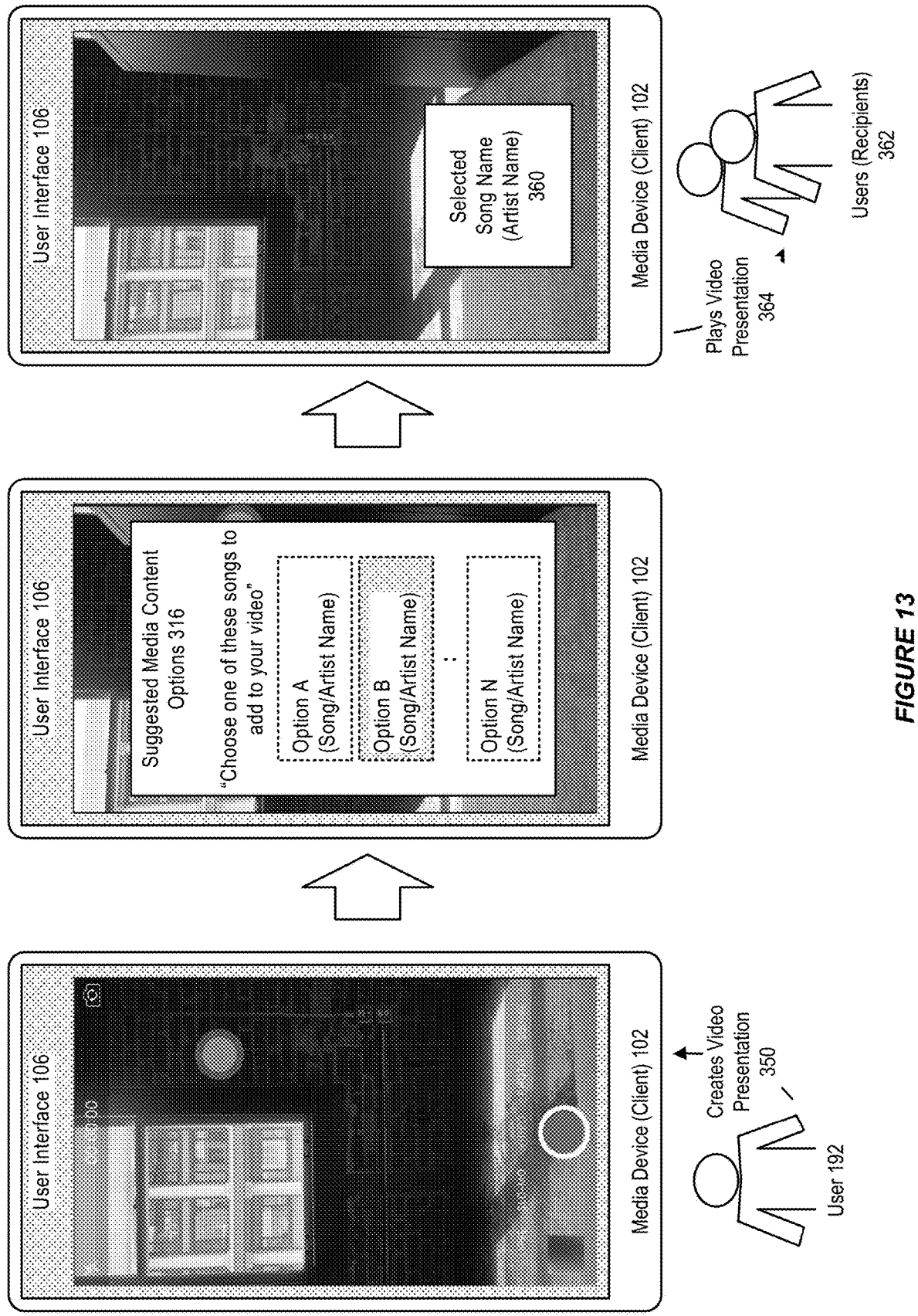
FIG. 13 further illustrates the programming of song suggestions for users of a social messaging environment, in accordance with an embodiment.

FIG. 13 further illustrates the programming of song suggestions for users of a social messaging environment, in accordance with an embodiment.

As illustrated in FIG. 13, during recording of the video presentation, a selection can be made on a video creation screen, to add a media content (e.g., music or song clip) to the video presentation being created, which enables a metadata 360 associated with the selected media content to be associated with the video presentation, so that the recipient 362 can both hear the song clip, and see the song metadata when they play 364 the video.

Figure 14:
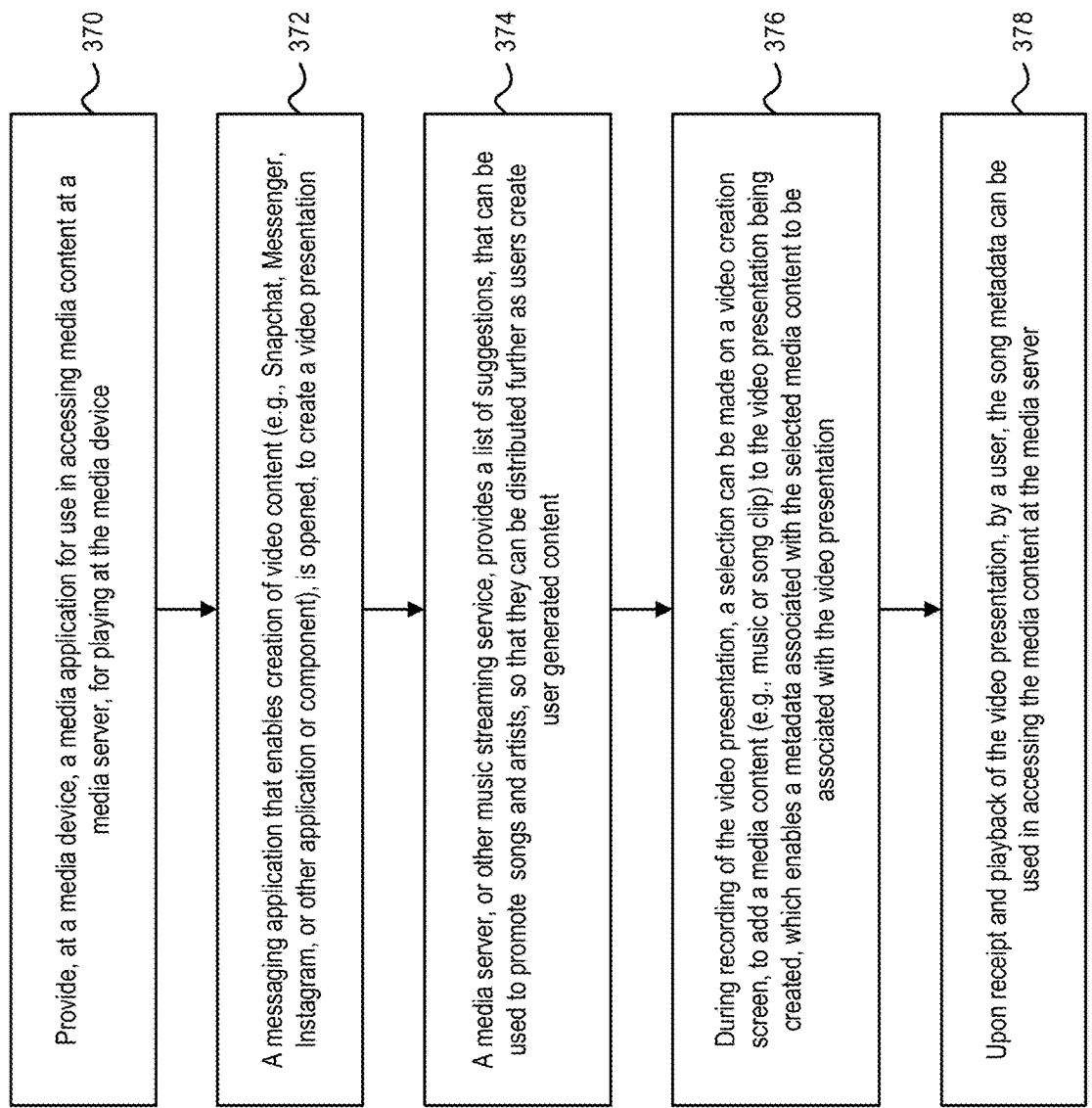
FIG. 14 illustrates a process of programming song suggestions for users of a social messaging environment, in accordance with an embodiment.

FIG. 14 illustrates a process of programming song suggestions for users of a social messaging environment, in accordance with an embodiment.

As illustrated in FIG. 14, in accordance with an embodiment, at step 370, a media application is provided for use in accessing media content at a media server, for playing at a media device.

At step 372, a messaging application that enables creation of video content (e.g., Snapchat, Messenger, Instagram, or other application or component), is opened, to create a video presentation.

At step 374, a media server, or other music streaming service, provides a list of suggestions, that can be used to promote songs and artists, so that they can be distributed further as users create user generated content (UGC).

At step 376, during recording of the video presentation, a selection can be made on a video creation screen, to add a media content (e.g., music or song clip) to the video presentation being created, which enables a metadata associated with the selected media content to be associated with the video presentation.

At step 378, upon receipt and playback of the video presentation, by a user, the song metadata can be used in accessing the media content at the media server.

Embodiments of the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of embodiments of the present invention has been provided for the purposes of illustration and description. It is not intended to be exhaustive or to limit the invention to the precise forms disclosed. Many modifications and variations will be apparent to the practitioner skilled in the art.

For example, while the techniques described above generally illustrate examples such as a music streaming service such as Spotify, and streamed music or song content, the systems and techniques described herein can be similarly used with other types of media content environments, and other types of streamed data or media content.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for providing a live lyrics overlay in a social messaging environment, comprising:
one or more computers, including a media server executing thereon adapted to receive requests from client media devices for media content;
wherein each client media device includes a user interface for displaying media content options associated with items of media content receivable from the media server;
wherein the client media device is adapted to communicate with the media server, and to enable access to a social messaging environment; and
wherein during creation and recording of a video content at a media device,
a particular song is selected to be played during the recording of the video content at the media device;
lyrics or other information corresponding to the particular song are retrieved from a lyrics source, for display within the video content as a lyrics lens overlay; and a media file is created which incorporates the recorded video content, and the particular song lyrics or other information corresponding to the song, together with a song metadata;

wherein the song metadata provides an indication of the particular song for use by the media server in providing access to at least a portion of the particular song, upon playback of the media file and the recorded video content at one or more recipient media devices.

2. The system of claim 1, wherein the video with lyrics lens overlay is provided to one or more client media devices, and the system is configured to use a song metadata associated therewith to play the video with lyrics lens overlay, and access the media content identified by the song metadata, at the media server.

3. The system of claim 1, wherein during recording of a live video, the lyrics of a song are displayed on the live video as the lyric lens overlay.

4. The system of claim 1, wherein the video is created using one of a messaging application, or a user-generated video content application.

5. A method for providing a live lyrics overlay in a social messaging environment, comprising:

providing, at one or more computers, a media server executing thereon adapted to receive requests from client media devices for media content;

wherein each client media device includes a user interface for displaying media content options associated with items of media content receivable from the media server;

wherein the client media device is adapted to communicate with the media server, and to enable access to a social messaging environment; and during creation and recording of a video content at a media device, upon selection of a particular song to be played during the recording of the video content at the media device, retrieving lyrics or other information corresponding to the particular song from a lyrics source, for display within the video content as a lyrics lens overlay; and creating a media file which incorporates the recorded video content, and the particular song lyrics or other information corresponding to the song, together with a song metadata;

wherein the song metadata provides an indication of the particular song for use by the media server in providing access to at least a portion of the particular song, upon playback of the media file and the recorded video content at one or more recipient media devices.

6. The method of claim 5, wherein the video with lyrics lens overlay is provided to one or more client media devices, and a song metadata associated therewith is used to play the video with lyrics lens overlay, and access the media content identified by the song metadata, at the media server.

7. The method of claim 5, wherein during recording of a live video, the lyrics of a song are displayed on the live video as the lyric lens overlay.

8. The method of claim 5, wherein the video is created using one of a messaging application, or a user-generated video content application.

9. A non-transitory computer readable storage medium, including instructions stored thereon which when read and executed by one or more computers cause the one or more computers to perform the steps comprising:

providing, at one or more computers, a media server executing thereon adapted to receive requests from client media devices for media content;

wherein each client media device includes a user interface for displaying media content options associated with items of media content receivable from the media server;

wherein the client media device is adapted to communicate with the media server, and to enable access to a social messaging environment; and during creation and recording of a video content at a media device, a particular song is selected to be played during the recording of the video content at the media device;

retrieving lyrics or other information corresponding to the particular song from a lyrics source, for display within the video content as a lyrics lens overlay; and creating a media file which incorporates the recorded video content, and the particular song lyrics or other information corresponding to the song, together with a song metadata;

wherein the song metadata provides an indication of the particular song for use by the media server in providing access to at least a portion of the particular song, upon playback of the media file and the recorded video content at one or more recipient media devices.

10. The non-transitory computer readable storage medium of claim 9, wherein the video with lyrics lens overlay is provided to one or more client media devices, and a song metadata associated therewith is used to play the video with lyrics lens overlay, and access the media content identified by the song metadata, at the media server.

11. The non-transitory computer readable storage medium of claim 9, wherein during recording of a live video, the lyrics of a song are displayed on the live video as the lyric lens overlay.

12. The non-transitory computer readable storage medium of claim 9, wherein the video is created using one of a messaging application, or a user-generated video content application.

* * * * *